United States Patent [19]

Ikemori

[11] 4,376,571
[45] Mar. 15, 1983

[54] PHOTOGRAPHIC SMALL SIZE OBJECTIVE

[75] Inventor: Keiji Ikemori, Yokohama, Japan

[73] Assignee: Canon Kabushiki Kaisha, Tokyo, Japan

[21] Appl. No.: 269,902

[22] Filed: Jun. 3, 1981

[30] Foreign Application Priority Data

Jun. 6, 1980 [JP] Japan .................. 55-76419

[51] Int. Cl.³ ............................................. G02B 9/60
[52] U.S. Cl. ................................................. 350/467
[58] Field of Search .................................... 350/467

[56] References Cited

U.S. PATENT DOCUMENTS

| | | | |
|---|---|---|---|
| 2,319,171 | 5/1943 | Warmisham et al. | 350/467 |
| 3,817,603 | 6/1974 | Takahashi | 350/467 |
| 4,264,138 | 4/1981 | Imai | 350/467 |
| 4,277,149 | 7/1981 | Konoma | 350/467 |

FOREIGN PATENT DOCUMENTS

| | | | |
|---|---|---|---|
| 38-11587 | 7/1963 | Japan | 350/467 |
| 54-104335 | 8/1979 | Japan | 350/467 |
| 55-100520 | 7/1980 | Japan | 350/467 |

*Primary Examiner*—John K. Corbin
*Assistant Examiner*—Scott J. Sugarman
*Attorney, Agent, or Firm*—Toren, McGeady & Stanger

[57] ABSTRACT

A photographic small size objective of the modified Gauss type which is well corrected for high grade imaging performance. The objective comprises, from front to rear, a first lens in a meniscus form of positive power with its convex curvature toward the front, a second lens in a similar form, a third lens in a meniscus form of negative power with its convex curvature toward the front, a fourth lens in a meniscus form of negative power with its convex curvature toward the rear, and a fifth lens of positive power with its rear surface having a strong refractive power.

2 Claims, 16 Drawing Figures

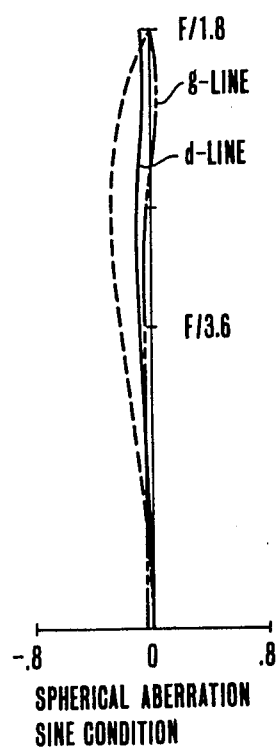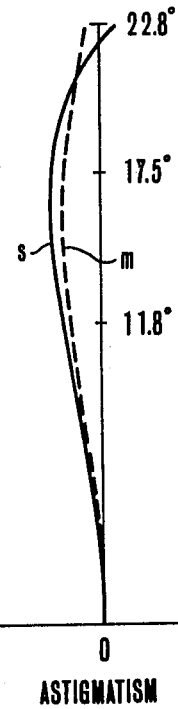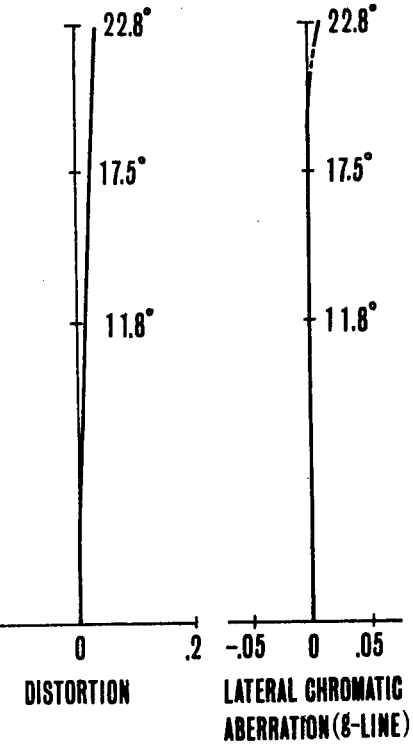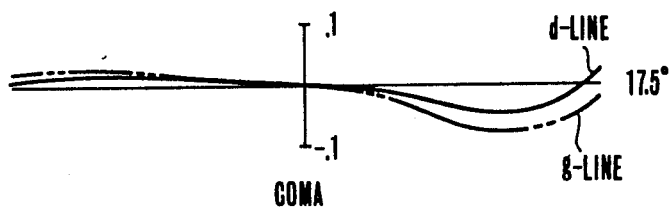

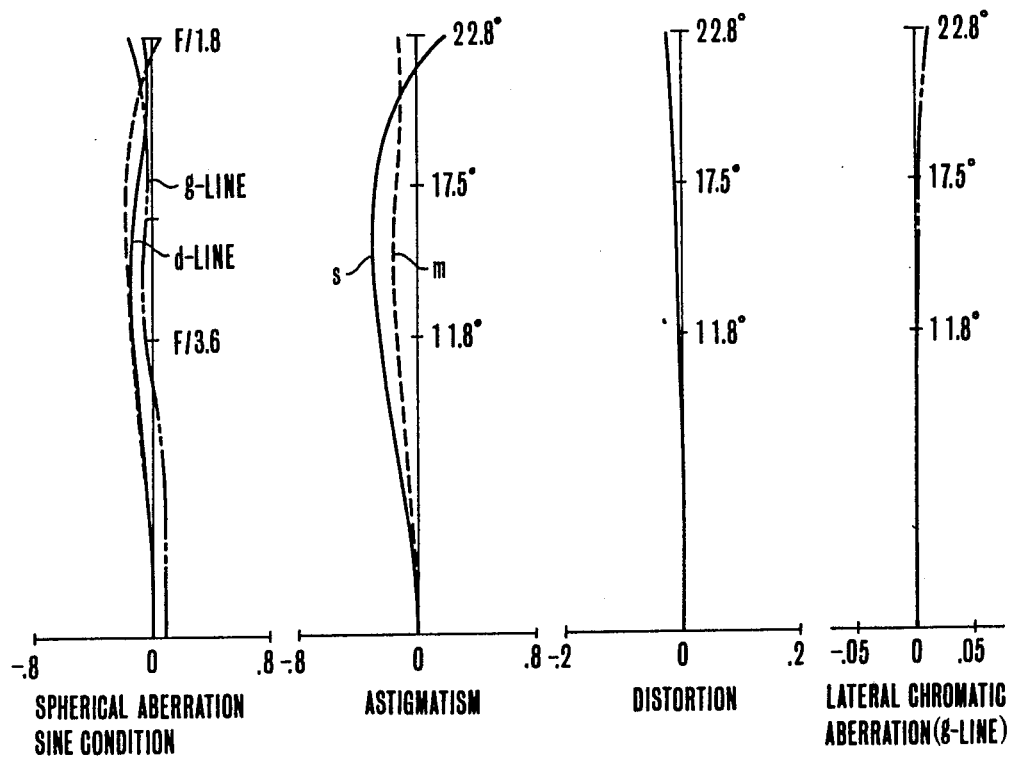
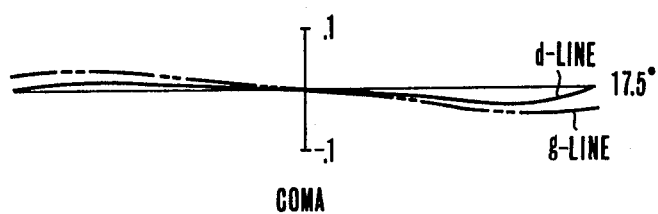

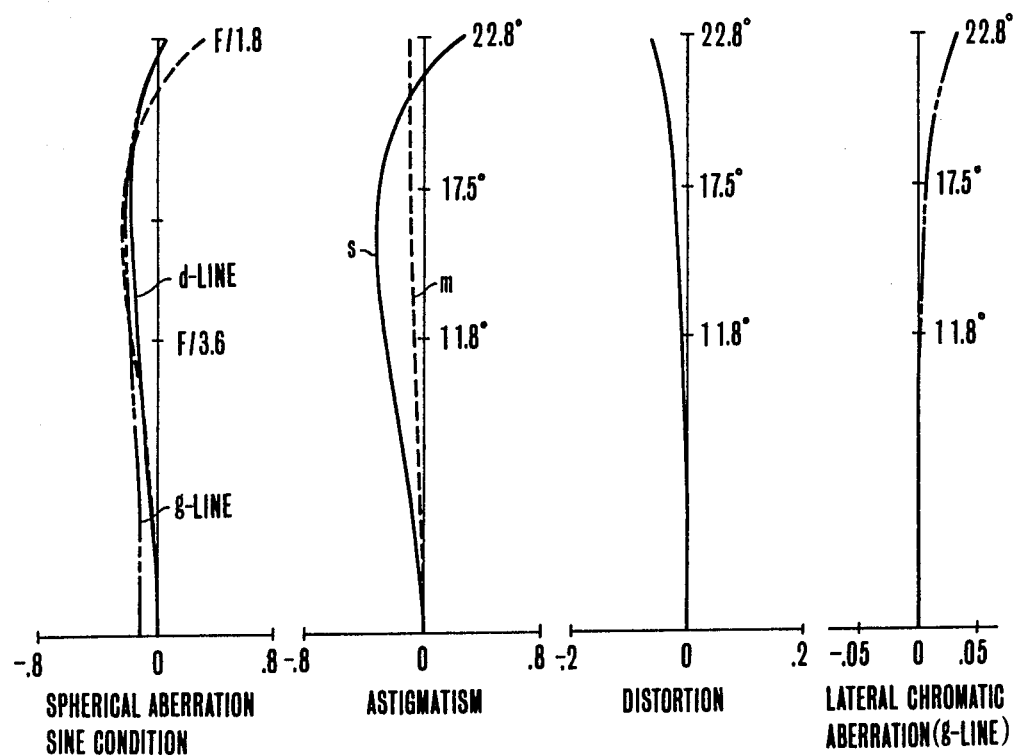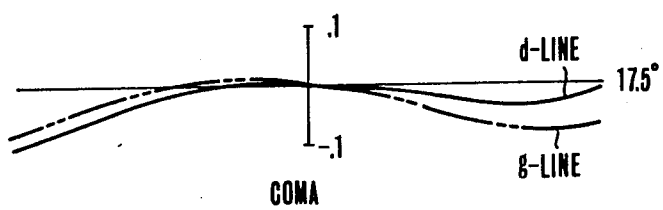

PHOTOGRAPHIC SMALL SIZE OBJECTIVE

BACKGROUND OF THE INVENTION

1. Field of the Invention

This invention relates to photographic objectives of the modified Gauss type, and more particularly to such objectives suited to be used as the standard lens for 35 mm single lens reflex cameras. In one form the objective includes four meniscus lenses and a fifth lens having positive power and a rear surface having a strong refractive power.

2. Description of the Prior Art

In general, the Gauss type objective is, because of its having a cemented lens just in the rear of the diaphragm, feasible to achieve good correction of chromatic aberrations such as longitudinal chromatic aberration, lateral chromatic aberration and color comatic aberration. On the other hand, an objective of what may be called the modified Gauss type with five elements constituting five components is disclosed, for example, in U.S. Pat. No. 2,720,139 and Japanese Pat. No. Sho 38-12983 where the first and second counting from the front are positive meniscus lenses of forward convexity, the third is a negative meniscus lens of forward convexity followed by a diaphragm, the fourth is a negative meniscus lens of rearward convexity, and the fifth is a positive meniscus lens. This type of objective is advantageous in minimizing the bulk and size of the apparatus. It is, however, very difficult to make the lens which follows the diaphragm, which is important to provide satisfactory correction of chromatic aberrations, since this lens is a singlet.

Therefore, this residual chromatic aberration must be compensated for by the suitable design of other lenses. It is, however, impossible in the present state of the art to achieve as good a correction as when the doublet is used in the rear of the diaphragm. Such substitution of the singlet for the doublet further aggravates other aberrations such as spherical aberration and curvature of field. As compared with the six-component Gauss type objective, there is a clear distinction in the optical performance. As a result, the general trend is to reduce the angular field, or the F-number to as dark a value as F2 or less in order to preserve the image quality.

SUMMARY OF THE INVENTION

An object of the present invention is to provide good compensation for the under-correction of chromatic aberrations which is a drawback of the conventional five-component-five-element objective, without negatively influencing other aberration correction, and to provide an objective having an imaging performance equal to or higher than that of the six-component Gauss type objective. It will be seen, from embodiments of the invention to be described later, that the objective in question has an F-number increased to f/1.8 which is common to the 6-component objectives, and is suited for use as the compact standard lens of high quality for 35 mm single lens reflex cameras.

BRIEF DESCRIPTION OF THE DRAWINGS

FIGS. 2(a), (b), (c), (d) and (e) are graphic representations of the various alternatives of the objective of FIG. 1.

FIGS. 3(a), (b), (c), (d) and (e) are graphic representations of Example 2 embodiments of the invention.

FIGS. 4(a), (b), (c), (d) and (e) are graphic representations of Example 3 embodiments of the invention.

DETAILED DESCRIPTION OF THE PREFERRED EMBODIMENTS

Figure 1:
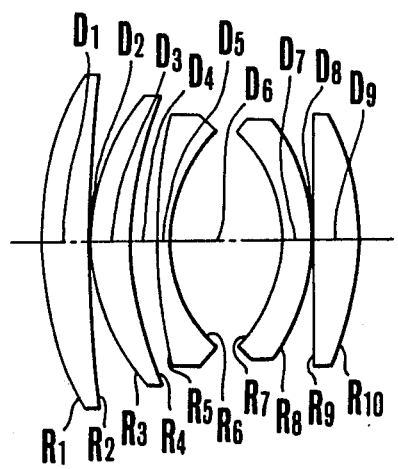
FIG. 1 is a block diagram of an Example 1 embodiment of the invention.

The present invention is to provide an objective comprising, from front to rear, positive meniscus 1st and 2nd lenses each convex toward the front, a negative meniscus 3rd lens convex toward the front, a negative meniscus 4th lens convex toward the rear, and a positive 5th lens with its rear surface having a stronger curvature, and satisfying the following conditions:

$$0.04 < D_4/f < 0.06 \tag{1}$$

$$21.2 \leq \nu_2 - \nu_3 < 28 \tag{2}$$

$$0.29 < |\psi_1| \cdot f < 0.75, \; \psi_1 < 0 \tag{3}$$

where f is the focal length of the entire system; $D_4$ is the axial air separation between the 2nd and 3rd lenses; $\nu_2$ and $\nu_3$ are the Abbe numbers ($\nu d$) of the 2nd and 3rd lenses respectively; and $\psi_1$ concerns with the air lens between the 2nd and 3rd lenses and is defined by $\psi_1 = (1 - N_2)/R_4 + (N_3 - 1)/R_5$ where $N_2$ and $N_3$ are the indices of refraction for d line of the 2nd and 3rd lenses respectively; $R_4$ is the radius of curvature of the rear surface of the 2nd lens; and $R_5$ is the radius of curvature of the front surface of the 3rd lens.

Each of the conditions is explained below.

Referring now to FIG. 1 condition (1) is, along with condition (2) desirable to provide amply chromatic aberration correction particularly color comatic aberration. The fact that a faster objective can be realized despite the decreased number of lens elements is largely ascribable to this condition. That is, the axial separation between the 2nd and 3rd lenses is wider than in the prior art to create an appreciable difference between the heights of incidence of off-axis rays of light from the optical axis on the surfaces $R_4$ and $R_5$. The use of a low dispersion glass in the 2nd lens and a high dispersion glass in the 3rd lens is made to increase the Abbe number difference to a considerable extent, thereby it being made possible to achieve good correction of longitudinal chromatic aberration, lateral chromatic aberration and even color comatic aberration. Further, spherical aberration and coma can be also amply corrected. When the lower limit of condition (1) is exceeded, under-correction of the color comatic aberration results. When the upper limit is exceeded, the back-focal distance can be no longer held in the prescribed value so that with the objective mounted on the single lens reflex camera when the mirror is flipped upward, the mirror will interfere with the rearmost lens element. When the lower limit of condition (2) is exceeded, not only under-correction of the color comatic aberration results, but also under-correction of the longitudinal chromatic aberration and over-correction of lateral chromatic aberration (for g line) result. When the upper limit is exceeded, the balance of the longitudinal and lateral chromatic aberrations will be broken.

Condition (3) is to amply correct spherical aberration and off-axis sagittal halo. When the lower limit is exceeded, under-correction of the spherical aberration and sagittal halo will result, which is unacceptable to the realization of as fast a lens speed as F/1.8 class.

When the upper limit is exceeded, large higher-order spherical aberrations are produced, and the spherical aberrations suddenly change from over-correction to under-correction as the aperture nears the full open, and a contrast loss result at full aperture.

To facilitate a further improvement of the overall image aberrations, it is preferred to satisfy the following conditions.

$$1.72 < (N1 + N2 + N5)/3 < 1.81 \quad (4)$$

$$6.7 < (1/R_6 + 1/|R_7|) \cdot f < 8 \quad (5)$$

$$0.045 < D_7/f < 0.082 \quad (6)$$

$$20 < \nu 3 < 28; \; 1.75 < N3 < 1.93 \quad (7)$$

$$46 < \nu 5 < 60 \quad (8)$$

where N1 and N5 are the refractive indices (for d line) of the 1st and 5th lenses respectively; $R_6$ is the radius of curvature of the rear surface of the 3rd lens; $R_7$ is the radius of curvature of the front surface of the 4th lens; $D_7$ is the axial thickness of the 4th lens; and $\nu 5$ is the Abbe number ($\nu d$) of the 5th lens.

Condition (4) is to provide good correction of field curvature. When the lower limit is exceeded, the Petzval sum becomes too large with an increase of the field curvature. When the upper limit is exceeded, even though the Petzval sum is improved, as the availability of existing glasses limits a range of Abbe numbers, the chromatic aberrations become difficult to correct, and, as the usable glasses are very expensive, the production cost is increased. Condition (5) is to facilitate an improvement of the sagittal halo and the coma in the intermediate zone of the picture area by limiting the curvatures of the surfaces $R_6$ and $R_7$ in front of and in the rear of the diaphragm respectively. This limitation causes the deterioration of the spherical aberration, field curvature and astigmatism, but condition (1) which strengthens the power of the air lens between the 2nd and 3rd lenses serves to effect good compensation therefor.

When the lower limit of condition (5) is exceeded, satisfactory correction of spherical aberration, field curvature and astigmatism is difficult. When the upper limit is exceeded, the production of sagittal halo and coma in the intermediate zone becomes serious. Condition (6) is to maintain a necessary back focus clearance by the limitation of the thickness of the 4th lens, and to provide ample correction of spherical aberration. That is, the 4th lens is thickened to some extent so that the back focal distance is increased, and the heights of the points from the optical axis at which a paraxial light ray crosses the both surfaces of that lens are differentiated for satisfactory correction of spherical aberration. When the lower limit is exceeded, the resultant back focus clearance and the spherical aberration are not acceptable. When the upper limit is exceeded, though the back focus clearance is kept long, the balance of the spherical aberration and astigmatism is broken, and further lateral chromatic aberration (for g line) is under-corrected.

The present invention employs a form of construction in which the lens elements that follow the diaphragm do not have a cemented surface as in the conventional 6-component standard objective of the Gauss type in order that longitudinal chromatic aberration and lateral chromatic aberration are both satisfactorily corrected. Accordingly it is required to select a glass of as low a dispersion as possible for employment in the 5th lens, and at least a range defined in condition (8) is necessitated. Again, the 3rd lens is also preferably made up of a glass of as high a dispersion as possible for the same purposes, and further this glass has to have a high refractive index for correction of spherical aberration and sagittal halo. Because of this, condition (7) is defined. Beyond these ranges, zonal spherical aberration becomes large, and the sagittal halo is largely increased so that it is difficult to achieve an increase in the imaging performance. Among the commercially available glasses, it is usual that $\nu 3$ is not less than 20, N3 is not more than 1.93, and $\nu 5$ is not more than 60. The glasses beyond these values are very expensive, and have poor chemical stability, and it is found that a photographic objective using these glasses is not practical.

Examples of specific objectives can be constructed in accordance with the following numerical data. The lens configuration of Example 1 is shown in FIG. 1, and the spherical aberration, sine condition, astigmatism, distortion, lateral chromatic aberration and comatic aberration of the objective of FIG. 1 for infinitely distant object are represented in FIGS. 2(a), (b), (c), (d) and (e) respectively. Also the various aberrations of Example 2 are represented in FIGS. 3(a), (b), (c), (d) and (e) respectively, and also the various aberrations of Example 3 in FIGS. 4(a), (b), (c), (d) and (e). It is to be understood from the above aberration curves particularly regarding the spherical aberration curves and comatic aberration curves for spectral d and g lines along with the lateral chromatic aberration curves that a good correction of the chromatic aberrations is achieved.

Example 1

Focal Length f = 100   F-number: 1.8   Image Angle $2\omega = 45.5°$

| Radius of Curvature | Thickness & Separation | Refractive Index (Nd) | Abbe Number ($\nu d$) |
|---|---|---|---|
| $R_1$  66.583   | $D_1$  8.573  | $N_1$ 1.8061  | $\nu_1$ 40.9 |
| $R_2$  366.202  | $D_2$  0.31   |               |              |
| $R_3$  35.5245  | $D_3$  6.151  | $N_2$ 1.804   | $\nu_2$ 46.6 |
| $R_4$  54.1095  | $D_4$  4.167  |               |              |
| $R_5$  107.959  | $D_5$  2.171  | $N_3$ 1.80518 | $\nu_3$ 25.4 |
| $R_6$  27.4583  | $D_6$  18.268 |               |              |
| $R_7$  −29.4554 | $D_7$  4.942  | $N_4$ 1.84666 | $\nu_4$ 23.9 |
| $R_8$  −40.447  | $D_8$  0.271  |               |              |
| $R_9$  −602.818 | $D_9$  8.281  | $N_5$ 1.804   | $\nu_5$ 46.6 |
| $R_{10}$ −48.164 |              |               |              |

3rd Order Aberration Coefficients of Example 1

|   | L | T | SA | OM | AS | PT | DS |
|---|---|---|---|---|---|---|---|
| 1 | 0.020831  | 0.006066  | 0.837171  | 0.243808  | 0.071004  | 0.670322  | 0.215895 |
| 2 | 0.009750  | −0.017031 | 0.331366  | −0.578833 | 1.011113  | −0.121878 | −1.553324 |
| 3 | 0.018538  | 0.006077  | −0.105350 | −0.034538 | −0.011323 | 1.254560  | 0.407588 |
| 4 | 0.003535  | −0.013003 | 0.096570  | −0.355250 | 1.305844  | −0.823656 | −1.777489 |
| 5 | −0.020967 | 0.027719  | −1.223361 | 1.617292  | −2.138072 | 0.413157  | 2.280350 |
| 6 | −0.038954 | −0.015947 | −1.632320 | −0.668229 | −0.273555 | −1.624422 | −0.776982 |
| 7 | 0.043823  | 0.017162  | −3.518107 | 1.377762  | −0.539559 | −1.556528 | 0.820870 |
| 8 | 0.029686  | −0.018169 | 0.694290  | −0.424923 | 0.260063  | 1.133535  | −0.852917 |

-continued

| 3rd Order Aberration Coefficients of Example 1 | | | | | | | |
|---|---|---|---|---|---|---|---|
| | L | T | SA | OM | AS | PT | DS |
| 9 | −0.000145 | 0.011987 | 0.000008 | −0.000687 | 0.056874 | −0.073932 | 1.412118 |
| 10 | 0.021383 | −0.004661 | 4.684623 | −1.021228 | 0.222624 | 0.925335 | −0.250250 |
| total | −0.000167 | 0.000201 | 0.164890 | 0.155174 | −0.033988 | 0.196493 | −0.074141 |

L: Lateral Chromatic Aberration
T: Longitudinal Chromatic Aberration
SA: Spherical Aberration
CM: Comatic Aberration
AS: Astigmatic Aberration
PT: Petzval Sum
DS: Distortion

Example 2

Focal Length f = 100   F-number: 1.8   Image Angle 2ω = 45.5°

| Radius of Curvature | Thickness & Separation | Refractive Index (Nd) | Abbe Number (νd) | | | |
|---|---|---|---|---|---|---|
| $R_1$ | 61.726 | $D_1$ | 8.42 | $N_1$ | 1.8061 | $\nu_1$ | 40.9 |
| $R_2$ | 250.22 | $D_2$ | 0.232 | | | | |
| $R_3$ | 38.045 | $D_3$ | 7.03 | $N_2$ | 1.7725 | $\nu_2$ | 49.6 |
| $R_4$ | 61.603 | $D_4$ | 4.731 | | | | |
| $R_5$ | 103.01 | $D_5$ | 2.317 | $N_3$ | 1.80518 | $\nu_3$ | 25.4 |
| $R_6$ | 26.1536 | $D_6$ | 20.297 | | | | |
| $R_7$ | −26.0623 | $D_7$ | 5.543 | $N_4$ | 1.80518 | $\nu_4$ | 25.4 |
| $R_8$ | −34.436 | $D_8$ | 0.232 | | | | |
| $R_9$ | ∞ | $D_9$ | 8.246 | $N_5$ | 1.6968 | $\nu_5$ | 55.5 |
| $R_{10}$ | −45.386 | | | | | | |

Example 3

Focal Length f = 100   F-number: 1.8   Image Angle 2ω = 45.5°

| Radius of Curvature | Thickness & Separation | Refractive Index (Nd) | Abbe Number (νd) | | | |
|---|---|---|---|---|---|---|
| $R_1$ | 82.194 | $D_1$ | 6.4 | $N_1$ | 1.8044 | $\nu_1$ | 39.6 |
| $R_2$ | 352.6 | $D_2$ | 0.31 | | | | |
| $R_3$ | 36.556 | $D_3$ | 7.358 | $N_2$ | 1.72916 | $\nu_2$ | 54.7 |
| $R_4$ | 79.176 | $D_4$ | 5.814 | | | | |
| $R_5$ | 120.979 | $D_5$ | 2.171 | $N_3$ | 1.7552 | $\nu_3$ | 27.5 |
| $R_6$ | 26.078 | $D_6$ | 19.372 | | | | |
| $R_7$ | −30.546 | $D_7$ | 7.752 | $N_4$ | 1.80518 | $\nu_4$ | 25.4 |
| $R_8$ | −42.067 | $D_8$ | 0.271 | | | | |
| $R_9$ | 484.21 | $D_9$ | 7.162 | $N_5$ | 1.6779 | $\nu_5$ | 55.3 |
| $R_{10}$ | −50.611 | | | | | | |

| Numerical Values of the Various Factors in the Conditions for the Examples | | | |
|---|---|---|---|
| Factor | Example 1 | Example 2 | Example 3 |
| $\|\phi_1\| \cdot f$ | 0.74 | 0.47 | 0.3 |
| $D_4/f$ | 0.042 | 0.047 | 0.058 |
| $\nu_2 - \nu_3$ | 21.2 | 24.2 | 27.2 |
| $(N_1 + N_2 + N_3)/3$ | 1.8047 | 1.7585 | 1.7372 |
| $(1/R_6 + 1/\|R_7\|) \cdot f$ | 7.04 | 7.66 | 7.11 |
| $D_7/f$ | 0.049 | 0.055 | 0.078 |
| $\nu_3$ | 25.4 | 25.4 | 27.5 |
| $N_3$ | 1.80518 | 1.80518 | 1.7552 |
| $\nu_5$ | 46.6 | 55.5 | 55.3 |

What is claimed is:

1. A photographic objective of small size consisting of five lens groups, each group having a single lens, including, from front to rear, a meniscus 1st lens of positive power convex toward the front;

a meniscus 2nd lens of positive power convex toward the front;

a meniscus 3rd lens of negative power convex toward the front;

a meniscus 4th lens of negative power convex toward the rear; and a 5th lens of positive power with its rear surface having a strong refractive power, and satisfying the following conditions:

$$0.04 < D_4/f < 0.06 \quad (1)$$

$$21.2 \leq \nu_2 - \nu_3 < 28 \quad (2)$$

$$0.29 < |\psi_1| \cdot f < 0.75, \ \psi_1 < 0 \quad (3)$$

where:

f is the focal length of the entire system;

Ni and νi are the refractive index and Abbe number of the i-th lens counting from the front respectively;

Di is the i-th lens thickness or air separation counting from the front;

Ri is the radius of curvature of the i-th lens surface counting from the front; and $$\psi_1 = (1 - N_2)/R_4 + (N_3 - 1)/R_5.$$

2. A photographic objective of small size consisting of five lens groups, each group having a single lens including, from front to rear, a meniscus 1st lens of positive power convex toward the front;

a meniscus 2nd lens of positive power convex toward the front;

a meniscus 3rd lens of negative power convex toward the front;

a meniscus 4th lens of negative power convex toward the rear; and a 5th lens of positive power with its rear surface having a strong refractive power, and satisfying the following conditions:

$$0.04 < D_4/f < 0.06 \quad (1)$$

$$21.2 \leq \nu_2 - \nu_3 < 28 \quad (2)$$

$$0.29 < |\psi_1| \cdot f < 0.75, \ \psi_1 < 0 \quad (3)$$

$$1.72 < (N_1 + N_2 + N_5)/3 < 1.81 \quad (4)$$

$$6.7 < (1/R_6 + 1/|R_7|)f < 8 \quad (5)$$

$$0.045 < D_7/f < 0.082 \quad (6)$$

$$20 < \nu_3 < 28, \ 1.75 < N_3 < 1.93 \quad (7)$$

$$46 < \nu_5 < 60 \quad (8)$$

where:

f is the focal length of the entire system;

Ni and νi are the refractive index and Abbe number of the i-th lens counting from the front respectively;

Di is the i-th lens thickness or air separation counting from the front;

Ri is the radius of curvature of the i-th lens surface counting from the front; and $$\psi_1 = (1 - N_2)/R_4 + (N_3 - 1)/R_5.$$

* * * * *